(No Model.)

C. W. BLACK & B. J. CHAPMAN.
FISHING LINE SINKER.

No. 531,090. Patented Dec. 18, 1894.

Witnesses
E. H. Monroe.
J. B. Devens.

By their Attorneys.

Inventors
Charles W. Black
Byron J. Chapman

C. A. Snow & Co.

UNITED STATES PATENT OFFICE.

CHARLES W. BLACK AND BYRON J. CHAPMAN, OF MICHIGAN CITY, INDIANA, ASSIGNORS OF ONE-THIRD TO FRANK M. BOECKLING, OF SAME PLACE.

FISHING-LINE SINKER.

SPECIFICATION forming part of Letters Patent No. 531,090, dated December 18, 1894.

Application filed May 22, 1894. Serial No. 512,104. (No model.)

*To all whom it may concern:*

Be it known that we, CHARLES W. BLACK and BYRON J. CHAPMANS, citizen of the United States, residing at Michigan City, in the county of La Porte and State of Indiana, have invented a new and useful Fishing-Line Sinker, of which the following is a specification.

Our invention consists of an improvement whereby the usual fishing-line sinkers are secured to the line so as to be capable of easy adjustment thereon, and so that the securing devices will not operate to tangle with the line as is the case with other devices of this class. These ends we attain by providing for each end of the sinker a hook around the shank of which the line is adapted to wrap in special lines, and an eye secured adjacent to each hook and bearing thereagainst so that the line is precluded from becoming disengaged, both elements being formed of spring metal, so that the line may be sprung past them and thereby disengaged.

Figure 1:
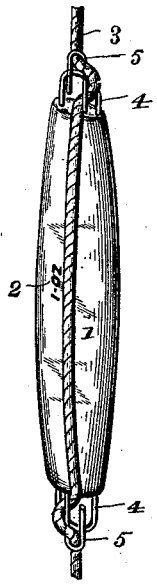
Figure 2:
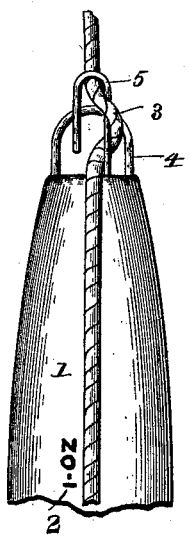
Figure 3:
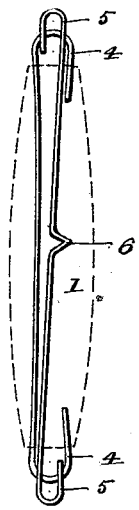
Figure 4:
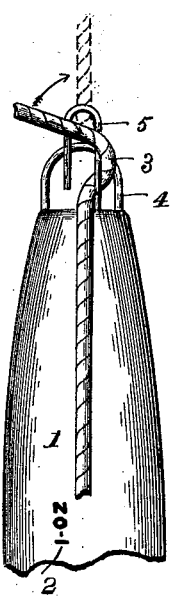

In the drawings: Figure 1 represents a perspective view of our complete device showing the line applied; Fig. 2, an enlarged side elevation of one end of the sinker; Fig. 3, an elevation of the wires forming the hooks and eyes and showing the relation of the sinker thereto; Fig. 4, an enlarged side elevation illustrating the mode of disengaging and engaging the line.

The reference numeral 1 indicates the sinker, which is preferably oval-shaped in cross-section and formed with the weight or size marks 2 thereon. These marks we prefer to affix by molding them as the sinker is molded, which may be done, as is well understood, by forming the marks on the molds.

3 indicates the line, and this is or may be of any kind or class. Each end of the sinker is provided with duplicate fastening devices, and these consist of the eyes 4 and hooks 5, both of which are formed of an integral piece of wire, as will appear from Fig. 3.

The eyes 4 are formed by bending the ends of a strip of wire so as to form oval or elliptical loops, and by extending the extreme ends of the wire inwardly and parallel with the main portion for a short distance. This device has the sinker molded around it, and with the ends of the sinker embracing the ends of the wire and extending into about one-third the length of the eye. By these means the eyes are secured in place with the greatest degree of rigidity, and with their displacement dependent upon the complete division of the metal composing the sinker. The hooks 5 are also formed of an integral piece of wire, and the said wire has its main portion lying within the sinker and parallel with the corresponding portion of the wire forming the eyes 4. Formed in the center of the wire of the hooks 5, is the bend or crook 6, which has the metal molded closely around it, and is provided to insure the rigid and immovable seating of the wire.

The ends of the wire in question are located beyond the ends of the sinker, and are bent inwardly to form the hooks 5, the extreme ends of the wire, or the points of the hooks, being arranged to terminate at a point directly adjacent to the outer curve of the eyes 4, while the bend of the hook is located outside or beyond said eyes. The wires of which these hooks and eyes are formed are of spring metal, so that they may be sprung apart at the points of contact to permit the insertion or removal of the line.

By reference to the drawings, particularly Fig. 4, the use of our invention may be understood; and there it will be seen that the line, when engaged with the sinker, is passed first around the shanks of the hooks 5 and thence between the point and the body of the attending eyes 4, until the line is located in the upper end of the hook and beyond the outer extremity of the eyes. When so arranged, the line will be free to pass through and around the hook when force is applied longitudinally to it.

It will be understood that the line is only passed between the hook and eye, by springing them apart, against their tendency, and that when so passed the parts will resume their normal position and operate to prevent any disengagement of the line, other than that which is produced by positive pressure on the line.

By means of our invention the line is securely connected to the sinker, so that it may be moved along the same, and so that no tangling will result from the manipulation of the line.

Having described our invention, what we claim is—

1. A sinker for fishing-lines, consisting of a weight having a hook rigidly secured thereto, said hook being arranged with its point beyond the surface of the weight and adapted to have the line passed through it, and an eye secured to the weight and adjacent to the hook, and being normally in engagement therewith, the hook and eye being adapted to hold the line by their engagement therewith, substantially as described.

2. A sinker for fishing-lines, and consisting of a weight having two wires embedded therein, the wires being extended beyond the sides of the weight at their ends and the ends of one wire being each bent to form a hook, while the ends of the second wire are each bent to form an eye, said eyes being arranged directly adjacent to their respective hooks and adapted to hold the line engaged therewith by their contact with the hooks, substantially as described.

In testimony that we claim the foregoing as as our own we have hereto affixed our signatures in the presence of two witnesses.

CHARLES W. BLACK.
BYRON J. CHAPMAN.

Witnesses:
ISIDORE I. SPIRO,
CHARLY RUNGE.